Oct. 23, 1951    M. F. POARCH    2,572,194
VIBRATOR TESTER
Filed Jan. 29, 1949
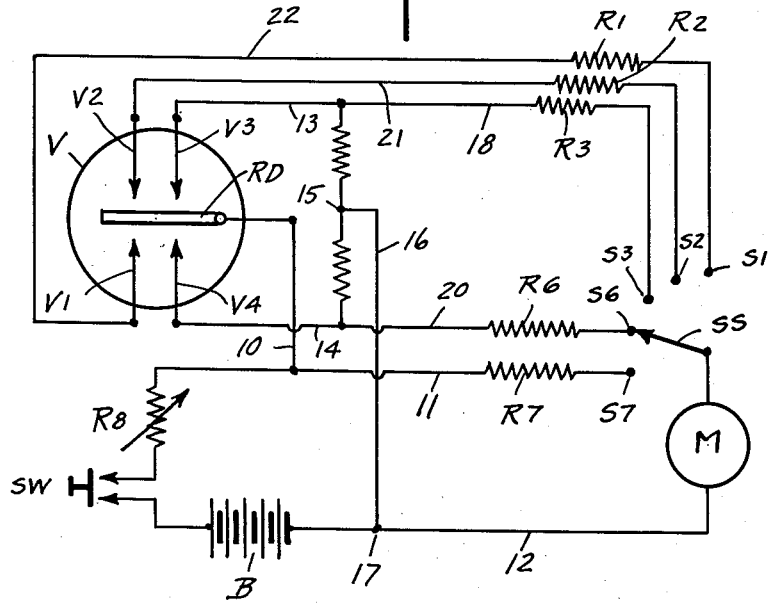
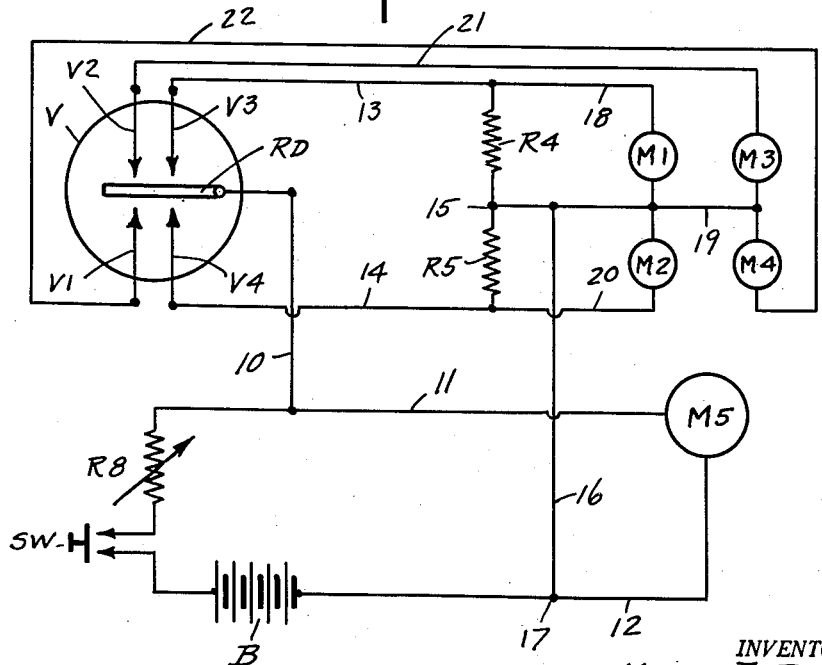
INVENTOR.
MYRON F. POARCH.
BY
Lockwood, Goldsmith & Galt
ATTORNEYS.

Patented Oct. 23, 1951

2,572,194

UNITED STATES PATENT OFFICE 2,572,194

VIBRATOR TESTER

Myron F. Poarch, Lima, Ohio

Application January 29, 1949, Serial No. 73,552

6 Claims. (Cl. 175—183)

This invention relates to a vibrator tester.

The chief object of the present invention is to test vibrators for their effectiveness and same is determined by measuring the percentage make of such a vibrator by means of a vibrator including circuit having indicating meter means therein.

The chief feature of the present invention resides in measuring the voltage through a pair of vibrating contacts when closed compared with the voltage source and such comparison is an indication of the percentage make or percentage of time the vibrator contacts are closed, which in turn is an indication of the effectiveness of the vibrator or device including the vibrating contacts.

Other objects and features of invention will be set forth more fully hereinafter.

The full nature of the invention will be understood from the accompanying drawings and the following description and claims:

In the drawings Fig. 1 is wiring diagram of a single meter including testing circuit embodiment of the invention.

Fig. 2 is a similar diagram of a multiple meter including circuit embodiment of the invention.

In a series circuit if a pair of vibrator contacts are frozen closed, the voltage drop across same is substantially zero or a short circuit. If the contacts are held in open position, an open circuit results and the voltage drop across the contacts is approximately source voltage or applied voltage. In the first case the resistance is substantially zero while in the second case it may be considered infinite.

If the vibrator contacts are in contact fifty percent of the time the effective ability to pass current is fifty percent. In comparison to the voltage source, the voltage appearing across such contacts will be one-half or fifty percent of such a voltage source. Thus considering the contacts as a resistance this resistance will vary in proportion to the percentage make of the contacts.

Thus by measuring with D. C. instruments the effective resistance across the contacts in a vibrating circuit the percentage ratio of make and break can be determined. The instrument may be compared to a simple ohmmeter which instead of measuring resistance measures percent-make of the vibrator contacts under operating conditions.

A vibrator includes rectifier contacts and interrupter contacts and the former are measured by what may be considered as a series type ohmmeter while the latter are measured by what may be considered as a shunt type ohmmeter. In this instrument the voltage source serves two purposes, namely to provide a power source for the operation of the vibrator, and to provide a voltage source for the ohmmeter type measuring circuit. The vibrator coil may be included in any one of three ways well known to the art. The vibrator as such may include any number of terminals, the usual number being five but a greater or lesser number may be required.

In the testing device, one or more sockets may be provided to accommodate various types of vibrators, each being plugged into its proper socket for test purposes. The circuit connections to the several sockets may be multiple in character and/or switch controlled so that when any vibrator is socket mounted it can be tested by the testing circuit device.

As set forth previously, Fig. 1 illustrates the single meter embodiment of the test circuit, the coil being omitted from the vibrator representation. Fig. 2 illustrates the multi-meter embodiment. Hence in Fig. 1 a selector switch accomplishes, through the respective meter multiplier resistances, all that the multi-meter embodiment accomplishes, and with a single meter. These resistors transform a milliampere meter into a voltmeter. The multimeter embodiment has its greatest application in the laboratory etc., while the single meter embodiment finds its greatest utility in a portable unit for service and repair purposes.

Vibrators may be of the synchronous or non-synchronous type. The present invention can be used with either type. The present invention, both forms being shown applied to synchronous vibrators, contemplates use of matched identical resistances which may be in the form of lamp bulbs in a metering circuit, such resistances being necessary for vibrator operation only, and when identical in value, having no appreciable effect upon the metering function.

Reference will first be had to Fig. 2. Herein V indicates a vibrator to be tested, only the coil and its connections being omitted for simplicity. The vibrator includes the reed RD connected by line 10 to battery B of the desired voltage. This connection includes manual switch SW and adjustable resistance R8. Across the same is voltmeter M5 connected by lines 11 and 12. Thus the desired voltage to be applied can be adjusted at R8 and indicated at M5.

The rectifier control is effected by reed RD and vibrator contacts V1 and V2 included in a synchronous vibrator. The interrupter control is effected by reed RD and vibrator contacts V3 and V4. Contacts V3 and V4 are connected by lines 13 and 14 to opposite ends of load resistors R4 and R5. The adjacent ends are connected together at 15 and line 16 therefrom is the battery return. Line 12 aforesaid is connected thereto at 17.

In multiple with resistor R4 is meter M1 using line 18 and return line 19. In multiple with resistor R5 is meter M2 using line 20 and return line 19. Meter M3 is connected to line 19 and by line 21 to contact V2 while meter M4 is connected to line 19 and by line 22 to contact V1. If a non-synchronous vibrator be tested, contacts V1 and V2 would not be present and lines 21 and 22 and meters M3 and M4 would not be used.

Now referring to Fig. 1 the same designations are employed herein as were specified in Fig. 2. Herein a single milliampere meter M is utilized in combination with selector switch SS. The meter is connected by line 12 to junction 17 in line 16.

Included in line 11 is resistor R7 terminating in switch contact S7. Line 20 includes resistor R6 and terminates in switch contact S6. Line 18 includes resistor R3 and terminates in switch contact S3. Line 21 includes resistor R2 and terminates in switch contact S2. Line 22 includes resistor R1 and terminates in contact S1.

The resistors R1, R2, R3, R6 and R7 are the resistors utilized permit use of a single milliampere meter M as a voltmeter and to retain the value indiation on that single meter. When arm SS contacts S7 the battery voltage can be adjusted at adjustable resistance R8. When contacts S6, S3, S2 and S1 are contacted by arm SS the meter M will indicate the percentage make of the vibrator contacts.

Referring to Fig. 1 and a specific example by way of illustration only, the battery may be of 9 volts. The resistor values are as follows:

R8, 2.5 at 10 w.
R4 and R5 each can be 21 C. P.-6 v. bulbs.
R3, 2800 ohms.
R6, 2800 ohms.
R1, 2000 ohms.
R2, 2000 ohms.
R7, 15,000 ohms.

Most vibrators are of 6 volt type. Assuming such to be tested and meter 17 to have a range of 0-1 ma. if R8 is adjusted for vibrator operation at 0.4 ma. any section reading 0.0 to 0.35 ma. on the meter is a "bad" section. Any section reading 0.35 ma. to 0.9 ma. is a "good" section. Any section reading 0.9 ma. to 1.0 ma. is also a bad section. Usually lamp bulbs are convenient but are not preferred for they deteriorate in use and their values shift as they heat up.

Fundamentally the present invention contemplates connection of the vibrator to a pair of resistors R4, R5 instead of a transformer secondary winding, and meter readings indicate percentage make and therefor the operativeness and condition of the vibrator.

As stated the basic invention can be applied to the testing of substantially all synchronous and non-synchronous types of vibrators and the percentage make is the determining basis for operational approval or disapproval of the vibrator tested and whether by one common meter selectively utilized or by a plurality of meters simultaneously utilized (Figs. 1 and 2 respectively).

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a testing apparatus for radio vibrators having a vibratory reed and at least a pair of contacts alternately engaged thereby, the combination of a source of direct current potential, a variable resistance in series with said source for varying the voltage delivered from said source, a pair of substantially identical resistive reactances of high current-low voltage type, a direct current operable meter means for measuring current flow, means for connecting each reactance to a vibrator contact, means for connecting the source to the vibrator at the reed thereof through said variable resistance, parallel connectors connected at one end to the reactances and at the other end to the meter means for multiple circuit arrangement, and means connecting both reactances and meter means to said source.

2. Testing apparatus as defined by claim 1 wherein the meter means comprises a meter for each reactance.

3. Testing apparatus as defined by claim 1 wherein the meter means comprises a single meter, a resistor for each reactance, and a switch arranged for selective connection of the resistors to the meter.

4. Testing apparatus as defined by claim 1 wherein there is included an adjustable resistance in the reed-source connecting means for potential control, and said meter means is arranged to measure the poential to be applied to the reed.

5. Testing apparatus as defined by claim 4 wherein the meter means comprises a meter for each reactance, and an additional meter for source potential measurement.

6. Testing apparatus as defined by claim 4 wherein the meter means comprises a single meter, a resistor for each reactance, a resistor in multiple with the source-reed connection between the adjustable resistance and the vibrator reed, and a switch arranged for selective connection of the resistors to the meter.

MYRON F. POARCH.

REFERENCES CITED

The following references are of record in the file of this patent:

UNITED STATES PATENTS

| Number | Name | Date |
| --- | --- | --- |
| 1,577,046 | Miller | Mar. 16, 1926 |
| 2,056,416 | Allen | Oct. 6, 1936 |
| 2,470,049 | Nulsen | May 10, 1949 |

OTHER REFERENCES

Article entitled "Vibrator Tester" by Dickey in Radio-Craft for December 1940, pages 340, 342, 343.